(12) United States Patent
Chen et al.

(10) Patent No.: US 9,361,523 B1
(45) Date of Patent: Jun. 7, 2016

(54) VIDEO CONTENT-BASED RETRIEVAL

(75) Inventors: Yang Chen, Westlake Village, CA (US); Swarup Medasani, Thousand Oaks, CA (US); Qin Jiang, Oak Park, CA (US); David L. Allen, Thousand Oaks, CA (US); Tsai-Ching Lu, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 600 days.

(21) Appl. No.: 12/841,078

(22) Filed: Jul. 21, 2010

(51) Int. Cl.
*G06K 9/03* (2006.01)
*G06K 9/00* (2006.01)

(52) U.S. Cl.
CPC ........ *G06K 9/00758* (2013.01); *G06K 9/00711* (2013.01); *G06T 2207/10016* (2013.01); *G06T 2210/00* (2013.01)

(58) Field of Classification Search
CPC .................... G06F 17/30811; G06F 17/30825; G06F 17/30858; G06F 17/30784; G06F 17/30781; G06K 9/00744; G06K 9/00758; G06K 9/00711; G06K 9/4676; G06K 9/0035; H04N 21/4622; G06T 2207/10016; G06T 3/0087
USPC .................. 382/103, 305; 348/548; 707/769, 707/E17.03
See application file for complete search history.

(56) References Cited

U.S. PATENT DOCUMENTS

| | | | | |
|---|---|---|---|---|
| 5,870,754 | A * | 2/1999 | Dimitrova | ......... G06F 17/30799 |
| 6,182,069 | B1 * | 1/2001 | Niblack et al. | |
| 6,600,784 | B1 * | 7/2003 | Divakaran | ......... G06F 17/30781 |
| | | | | 348/416.1 |
| 2006/0139494 | A1 * | 6/2006 | Zhou et al. | .................... 348/607 |
| 2007/0071344 | A1 * | 3/2007 | Ouzilevski | ................ G06T 5/20 |
| | | | | 382/254 |
| 2008/0288509 | A1 * | 11/2008 | Mysen | .............. G06F 17/30864 |
| 2009/0073265 | A1 * | 3/2009 | Greenhill et al. | ............. 348/148 |
| 2010/0092037 | A1 * | 4/2010 | Peleg | ................... G06F 17/3079 |
| | | | | 382/103 |
| 2010/0205176 | A1 * | 8/2010 | Ji | ....................... G06K 9/00704 |
| | | | | 707/737 |
| 2010/0303338 | A1 * | 12/2010 | Stojancic | .......... G06F 17/30799 |
| | | | | 382/154 |
| 2011/0202527 | A1 * | 8/2011 | McCloskey et al. | .......... 707/728 |
| 2011/0311129 | A1 * | 12/2011 | Milanfar | ............ G06K 9/00335 |
| | | | | 382/154 |

OTHER PUBLICATIONS

Nister et al, "Scalable recognition with a vocabulary tree, in Proc. of CVPR 2006".*
Nister et al, "Scalable recognition with a vocabulary tree", In Proc. of CVPR 2006.*
Daniel ("video retrieval using Spatio-temporal descriptors", ACM Multimedia '03, Nov. 2-8, 2003, Berkeley, California, USA).*
Beyer, K.S., et al., "When is 'nearest neighbor' meaningful?" In Berri, C., Buneman, P., eds.: Proceedings of the 7th International Conference on Database Theory (ICDT'99), Berlin, Germany (1999), pp. 217-235.

(Continued)

*Primary Examiner* — Amara Abdi
(74) *Attorney, Agent, or Firm* — Tope-McKay & Associates

(57) ABSTRACT

A method and system for video-content based retrieval is described. A query video depicting an activity is processed using interest point selection to find locations in the video that are relevant to that activity. A set of spatio-temporal descriptors such as self-similarity and 3-D SIFT are calculated within a local neighborhood of the set of interest points. An indexed video database containing videos similar to the query video is searched using the set of descriptors to obtain a set of candidate videos. The videos in the video database are indexed hierarchically using a vocabulary tree or other hierarchical indexing mechanism.

3 Claims, 10 Drawing Sheets

(56) References Cited

OTHER PUBLICATIONS

Bolle, R.M., et al., "Video Query: Research directions," IBM Journal of Research and Development, 42 (2):233-252, 1998.
Brunelli, O., et al., "A survey on the automatic indexing of video data," Journal of Visual Communication and Image Representation, 10(2):78-112, 1999.
Chang, S.F., et al., "VideoQ: An automated content based video search and retrieval system," Proceedings of ACM Multimedia, 1997.
Ciaccia, P., et al., "M-tree: An efficient access method for similarity search in metric spaces," Proceedings of the 23rd VLDB Conference, Athens, Greece, 1997.
Dagtas, S., et al., "Models for motion-based video indexing and retrieval," Image Processing, IEEE Transactons on, 2000.
DeMenthon, D., et al., "Video retrieval using spatio temporal descriptors," in Proceedings of 11th ACM International Conference on Multimedia, 2003.
Dollar, P., et al., "Behavior recognition via sparse spatio-temporal features," In VS-PETS 2005, pp. 65-72, 2005.
Efros, A.A., et al., "Recornizing action at a distance," In Proc. of IEEE Conf. on Computer Vision, Nice, France, Oct. 2003 (ICCV2003).
Egas, R. et al., "Adapting kOd trees to visual retrieval," In Proceedings of the International Conference on Visual Information Systems, Amsterdam, Jun. 1999, A. Smeulders and R. Jain, Eds., 533-540.
Fraundorfer, F., at al., "A binning scheme for fast hard drive based image search," in Proc. of CVPR 2007.
Gionis, A., et al., "Similarity search in high dimensions via hashing," Proc. Int'l Conf. Very Large Databases, pp. 518-529, 1999.
Hongeng, S., et al., "Large-scale event detection using semi-hidden Markov models," In Proc. IEEE Conf. on Computer Vision, vol. 2, 2003.
Shiyan Hu, "Efficient Video Retrieval by Locality Sensitive Hashing," in Proc. of IEEE International Conference on Acoustics, Speech, and Signal Processing, 2005 (ICASSP'05), Mar. 18-23, 2005, vol. 2, pp. 449-452.
Laptev, I., et al., "Spact-time interest points," In Proceedings of the ninth IEEE International Conference on Computer Vision, vol. 1, pp. 432-439, 2003.
Laptev, I., et al., "Retrieving actions in movies," in Proc. of IEEE 11th International Conference on Computer Vision (ICCV), Oct. 14-21, 2007, pp. 1-8.
Jain, A.K., et al., "Query by video clip," In Multimedia System, vol. 7, pp. 369-384, 1999.
Lowe, D.G., "Object recognition from local scale invariant feature," in Proc. of the International Conference on Computer Vision, ICCV, pp. 150-1157, 1999.
Yu-Fei Ma, et al., "Motion pattern-based video classification and retrieval," Journal on Applied Signal Processing 2003: 2, 199-208.
Naphide, H.R., et al., "A probabilistic framework for semantic video indexing, filtering, and retrieval," Multimedia, IEEE Transactions on Multimedia, Mar. 2001, vol. 3(1), pp. 141-151.
Niebles, J.C., et al., "Unsupervised learning of human action categories using spatial-temporal words," BMVC 2006.
Ning, H., et al., "Searchin human behaviors using spatial-temporal words," in Proc. of IEEE Int. Conf. on Image Processing (ICPR), 2007, vol. 6, pp. VI-337-340.
Nister, D., et al., "Scalable recognition with a vocabulary tree," in Proc. of CVPR 2006.
Oliver, N., et al., "A bayesian computer vision system for modeling human interactions," IEEE Trans. PAMI, Aug. 2000, vol. 22, issue: 8, pp. 831-843.
Hanan Samet, "Indexing issues in supporting similarity searching," in Advances in Multimedia Information Processing—PCM 2004: 5th Pacific Rim Conference on multimedia, Tokyo, Japan, Nov. 30-Dec. 3, 2004, K. Aizawa, Y. Nakamura, and S. Satoh (Eds.): LNCS 3332, pp. 463-470, 2004.
Schuldt, C., et al., "Recognizing human actions: a local SVM approach," in Proc. ICPR 2004, Cambridge, UK, 2004 (Also on the web at http://www.nada.kth.se/cvap/actions/).
Scott, G.J., et al., "EBS k-d tree: an entropy balanced statistical k-d tree for image databases with ground-truth labels," in Proc. of the 2nd Int. Conf. on Image and Video Retrieval. Urbana, Jul. 2003, E.M. Bakker, T.S. Huang, M.S. Lew, N. Sebe, and X. Zhou (Eds.), Springer-Verlag, London, pp. 467-476.
Scovanner, P., et al., "A 3-Dimensional descriptor and its application to action recognition," Proceedings of the 15th Int. Conf. on Multimedia, pp. 357-360 (ACM Multimecia'07) Augsburg, Germany, Sep. 23-28, 2007.
Shechtman, E., et al., "Matching local self-similarities across images and videos," in Proc. of CVPR 2007.
Sivic, J., et al., "Video Google: a text retrieval approach to object matching in videos," in Proc. of the 9th IEEE Int. Conf. on Computer Vision, 2003.
Snoek, C.G.M., et al., "Multimodal video indexing: a review of state-of-the-art multimedia tools and applications," vol. 25, No. 1, Jan. 2005.
Uhlmann, J.K., "Metric trees," Applied Mathematics Letters 4 (1991), 61-62.
Veeraraghavan, H., et al., "Learning dynamic event descriptions in image sequences," in Proc. of IEEE Conf. on CVPR 2007.
Yuk Man wong, et al., "An empirical study on large-scale content-based image retrieval," in proc. of 2007, IEEE International Conference on Multimedia and Expo., Jul. 2-5, 2007, pp. 2206-2209.
Ye, H., et al., "Fast search in large-scale image database using vector quantization," In Proc. of the 2nd Int. Conf. on Image and Video Retrieval, Urbana, Jul. 2003, E.M. Bakker, T.S. Huang, M.S. Lew, N. Sebe, and X. Zhou, (eds.), Springer-Verlag, London, 477-487.
Yuan, J., et al., "Fast and robust short video clip search using an index structure," in Proc. of ACM Workshop on Multimedia Information Retrieval (MIR'04), Oct. 2004, New York, pp. 61-68.
Zhou, W., et al., "On-line knowledge-and rule-based video classification system for video indexing and dissemination," Information Systems, vol. 27, pp. 559-586, 2002.
Zhou, T., et al., "Tracking multiple humans in complex situations," in IEEE Trans. on PAMI, vol. 26(9), Sep. 2004, pp. 1208-1221.
Laptev, I., "Learning realistic human actions from movies," IEEE Conference on Computer Vision and Pattern Recognition, 2008, Dates of Conference: Jun. 23-28, 2008, CVPR 2008.
The M-Tree Project, http://www-db.deis.unibo.it/Mtree/, Dec. 2, 2008.
Schindler, G., et al., "City-scale location recognition," IEEE Conference on Computer Vision and Pattern Recognition, 2007. Date of Conference: Jun. 17-22, 2007, CVPR 2007.

* cited by examiner

_US 9,361,523 B1_

VIDEO CONTENT-BASED RETRIEVAL

STATEMENT OF GOVERNMENT RIGHTS

This invention was made with Government support under Contract No. HR001-08-C-0028, awarded by the Defense Advanced Research Projects Agency. The Government has certain rights in the invention.

BACKGROUND OF THE INVENTION (1) Field of Invention

The present invention relates to video content retrieval and, more specifically, to a method and system for identifying an activity in a query video by generating descriptors for interest points in the videos, and searching for videos containing similar activities in a hierarchically arranged video database.

(2) Description of Related Art

Video archive search systems are known in the art. Previous approaches to video archive searching rely on some statistical information of the video images or global motion information in the video to classify videos into several predetermined classes. These approaches can only provide broad categories of contents of the videos, and are not specific to the activity contents. Furthermore, the previous approaches require prior knowledge of the content categories of the archive videos before organizing the videos in the archives to be searched. Therefore, any change in such information can render the search system out-dated, and the entire archive must be re-processed.

Thus, a continuing need exists for an efficient and scalable indexing mechanism and system for searching large video archives based on video activity content.

SUMMARY OF INVENTION

The present invention relates to video content retrieval and, more specifically, to a method and system for identifying an activity in a query video by generating descriptors for interest points in the videos, and searching for videos of similar activities in a hierarchically arranged video database. The method of the present invention is computer-implemented, and comprises an act of causing a computer to perform operations beginning with receiving a query video clip comprising a sequence of video frames, where the sequence of video frames depicts and activity. An interest point selection is then performed on the query video to obtain a set of interest points describing locations in the video frames that are relevant to the activity, and a set of spatio-temporal descriptors within a local neighborhood of the set of interest points are then calculated. An indexed video database containing videos similar to the query video is searched using the set of descriptors to obtain a set of candidate videos, which are output to a user or to a storage device for later viewing. Thus, the activity in the query video clip can be identified as a known activity as in the candidate videos.

In another embodiment of the method, the interest point selection comprises an operation of selecting points which have a high motion content, where the motion content is measured by a degree of difference between pixel values in a pair of consecutive image frames, and where high motion content exists if the measured motion content exceeds a predetermined threshold.

In yet another embodiment, the set of spatio-temporal descriptors are of a type selected from the group consisting of a self-similarity descriptor, and a shift-invariant feature transform descriptor.

In a further embodiment of the method, each candidate video is given a similarity score describing a degree of similarity between the candidate video and the query video.

In yet another embodiment, the method further comprises an operation of indexing a video database containing videos of known activities using a hierarchical indexing mechanism such as a vocabulary tree.

Another aspect of the present invention is a data processing system for content-based video retrieval. The data processing system comprises one or more processors configured to perform operations in accordance with the method of the present invention, as previously described.

A final aspect of the present invention is a computer program product for content-based video retrieval. The computer program product comprises computer-readable instruction means stored on a computer-readable medium that are executable by a computer having a processor for causing the processor to perform operation in accordance with the method of the present invention, as previously described.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
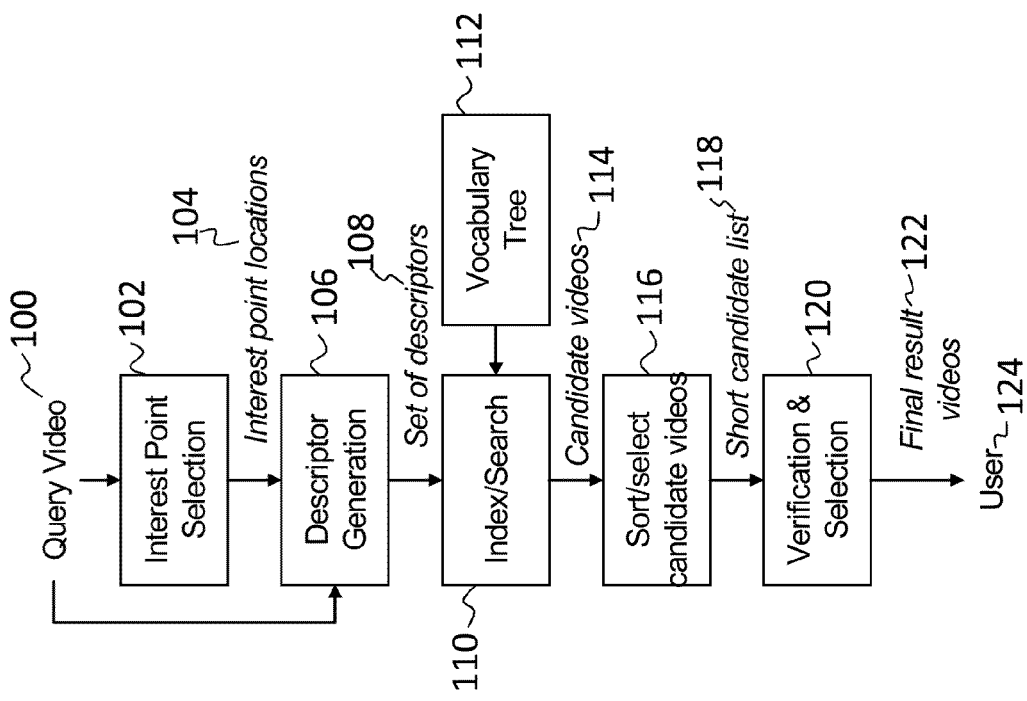
FIG. 1 is a block diagram of the activity-based video search system of the present invention.

The present invention relates to video content retrieval and, more specifically, to a method and system for identifying an activity in a query video by generating descriptors for interest points in the videos, and searching for videos of similar activities in a hierarchically arranged video database.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Further, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) LIST OF CITED REFERENCES

The following cited references are incorporated by references as though fully disclosed herein:
[1] Dollar, P., Rabaud, V., Cottrell, G., and Belongie, S., Behavior recognition via sparse spatio-temporal features. In VS-PETS 2005, pages 65-72, 2005.
[2] Laptev, I., and Lindeberg, T., Space-time interest points. In Proceedings of the ninth IEEE International Conference on Computer Vision, volume 1, pages 432-439, 2003.
[3] Lowe, D. G., Object recognition form local scale invariant feature, in Proc. of the International Conference on Computer Vision, ICCV, pp. 150-1157, 1999.
[4] Niebles, J. C., Wang, H. and Li, F., Unsupervised Learning of Human Action Categories Using Spatial-Temporal Words, BMVC 2006.
[5] Nister, D., and Stewenius, H., Scalable Recognition with a Vocabulary Tree, in Proc. of CVPR 2006.
[6] Schuldt, C., Laptev, I., and Caputo, B., Recognizing Human Actions: A Local SVM Approach, In Proc. ICPR 2004, Cambridge, UK, 2004. (Also on the web at www.nada.kth.se/cvap/actions/.
[7] Scovanner, P., Ali, S., and Shah, M., A 3-Dimensional Descriptor and its Application to Action Recognition, Proceedings of the 15th international conference on Multi-Media, pp. 357-360 (ACM MultiMedia'07) Augsburg, Germany Sep. 23-28, 2007.
[8] Eli Shechtman and Michal Irani, Matching Local Self-Similarities across Images and Videos, in Proc. of CVPR 2007.
[9] Sivic, J. and Zisserman, A. Video Google: a text retrieval approach to object matching in videos, in Proceedings of 9th IEEE International Conference on Computer Vision, 2003.
[10] Hartigan, J. A. (1975), Clustering Algorithms, Wiley, ISBN 0-471-35645-X.

(2) INTRODUCTION

The present invention proposes a method for searching videos based on the activity content of the videos. Being able to search videos based on the activity content, in particular human activities, has many applications to security, surveillance, video filtering on the Internet for content exclusion (such as pornography) and copyright enforcement.

A video search system usually contains two parts, descriptor generation and indexing scheme. Descriptors are extracted from the videos to represent the video content, in this case the activities, and the indexing scheme allows filing of videos in an efficient way so that videos containing similar activity contents can be found in a large video database in a very short time.

Conventional video content-based retrieval (VideoCBR) systems fall under two categories: feature-based and semantics-based. In a feature-based VideoCBR approach, features such as color and motion histograms are extracted from key frames or short sequences to represent the video, and conventional high-dimensional indexing schemes such as k-d tree are usually used for indexing. Obviously, this approach does not take advantage of any activity information in the video as the approach does not try to understand what's happening in the video. On the other hand, semantics-based VideoCBR approach tries to segment objects in the video and describe what's happening, such as the type of activity, using high-level descriptions. This approach is called video annotation. Searching can then be performed using a text-based keyword search such as a text search. However, since general purpose scene and video image analysis is a very hard problem, this approach cannot succeed without heavily restricting the domain in addition to relying on a pre-developed knowledge base for video understanding, which makes the approach very inflexible and difficult to use.

The present invention is inspired by the success of visual vocabulary of "Video Google" [9] (see "List of Cited References section, above), and especially the work of Nister and Stewenius [5], who showed that building a visual vocabulary tree can improve the performance in both scalability and retrieval accuracy for 2-D images. A visual vocabulary approach using a vocabulary tree is applied to spatio-temporal descriptors from videos, which takes advantage of the discrimination power of the descriptors as well as the scalability of the vocabulary tree for indexing. Furthermore, the present invention does not rely on any model-based activity recognition. Training of the vocabulary tree is done off-line using unlabeled data with unsupervised learning, therefore the approach is widely applicable.

(3) SYSTEM OVERVIEW

The top-level system block diagram of our activity based video search system is shown in FIG. 1. The system uses a short video clip as the query video 100, and retrieves a set of videos in the video database that contain same or similar activities. The query video clip 100 first undergoes an interest point selection process 102 in which a set of locations 104 in each video frames is identified that is relevant to the underlying activities. Next, a set of spatio-temporal features, also called spatio-temporal descriptors 108, are generated 106 within the local neighborhood (in time and space) of all interest point locations 104 identified in the interest point selection step 102. The set of descriptors 108 are then used to search 110 similar videos in the database with the help of an indexing data structure called "vocabulary tree" 112. The result of the search is a list of candidate videos 114, each of which is assigned a similarity score. In a next act, the videos are sorted 116 based on the similarity score, and a subset of the candidates is used (if there are too many candidates from the search step) to shorten the candidate list 118 for verification 120. The verification 120 is used to confirm the candidates in the short candidate list 118 do indeed contain similar activities as the query video 100 by using some other means than that employed in the search act. The verification 120 is optional if the candidate video set from the last step is small. The result is a further reduced set of candidate videos 122 that can be presented to a user 124.

(4) INTEREST POINT SELECTION

Interest points are the locations in space (image coordinates (x, y)) and time (video frames) where the descriptors will be evaluated to represent the activities in the query video. In order to increase the effectiveness of the descriptors, it is very important to select points where the descriptors are the most discriminative for different activities.

Figure 2:
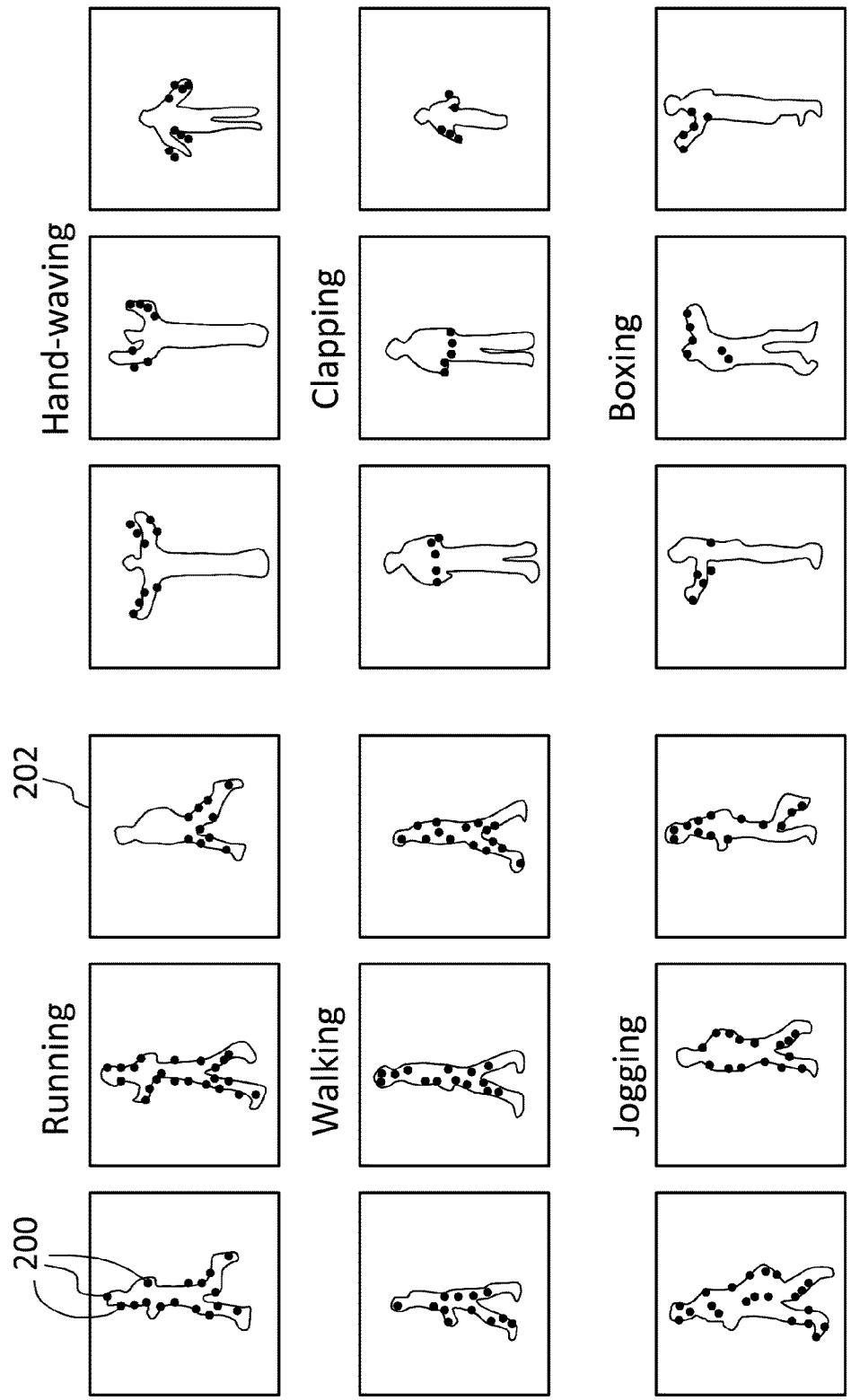
FIG. 2 is an illustration showing examples of sample video sequences showing selected interest points of high motion.

While recognizing the importance of interest point selection in activity representation by spatio-temporal descriptors, the emphasis of this invention is mainly in demonstrating activity-based searching in video archives. The present invention employs a very simple method of interest point selection. Motion pixels are found by examining absolute values of the difference of a pair of consecutive image frame in the video. The local maxima of the difference values are determined and then thresholded to select a set of points which usually concentrate along the outlines of human against the background in high motion content areas. Note that the present invention should not be construed to be limited to human activity only, as it is generally applicable to any activity. Interest points computed by comparing current and previous image frames and current and next image frames are combined together as the interest points for the current frame. Examples of the interest points picked this way are illustrated in FIG. 2. The interest points 200 are shows as black dots. The frames 202 illustrated in FIG. 2 represent pixilated images which will likely be presented in gray scale or color in practice depending on the imaging system used. It should be noted that this approach to interest point selection is not fool-proof and may need to be supplemented with other methods when the extent of the motion between frames becomes too large. However, this simple approach has the advantage of not involving any segmentation, and works well for most purposes.

(5) DESCRIPTOR GENERATIONS

Many spatio-temporal descriptors have been developed for activity recognition, such as in [1] and [4]. The present invention uses local self-similarity [8] and 3-D SIFT (shift-invariant feature transform) [7] for its descriptor generation, although other methods can be used. Self-similarity is a desirable method because it describes local object shapes, is robust to image contrast variation, invariant to absolute image intensity of objects, and handles homogeneous regions as well as textured image regions and even sketches [8]. 3-D SIFT is a desirable choice due to reported performance for activity recognition, and the well-known robustness of the original 2-D SIFT as reported in the literature [3]. Self-similarity and 3-D SIFT, as used with the present invention, are discussed in turn, below.

(5.1) Self-Similarity Measure (SSM)

Following the approach in [8], in 2-D images, a self-similarity measures for a pixel p is computed as follows. A small image patch (5×5 or 3×3 pixels for example, depending on image resolution) centered at p is compared with a larger neighborhood (in sizes 7×7 to 41×41 pixels for example, depending on image resolution) using sum-of-squared-difference (SSD) and using image intensity values, which are normalized to produce the self-similarity correlation surface for the neighborhood of p:

$$S_p(x, y) = \exp\left(-\frac{SSD_p(x, y)}{\max(\text{var}_{noise}, \text{var}_{auto}(p))}\right),$$

where $\text{var}_{noise}$ is a constant corresponding to variations caused by noise (was set to 4 in trials, corresponding to 2-bit of noise for 8-bit image pixels), and $\text{var}_{auto}$ measures the local image variation and is computed as the maximal variance of the differences of all patches surrounding p with respect to the patch located at p.

To increase the robustness of the self-similarity representation, the correlation surface defined above can be further quantized and transformed into a log-polar coordinates using 20 angle bins and four radial bins to form an 80-entry vector as the "self-similarity descriptor" vector $D_p$ for the pixel p. The transformed descriptor vector takes the maximum of all the values mapping into the same bin, giving the resulting descriptor invariance with respect to the local shapes of non-rigid deformations. Log-polar transform also gives the descriptor vector invariance to local affine deformations [8].

Figure 3:
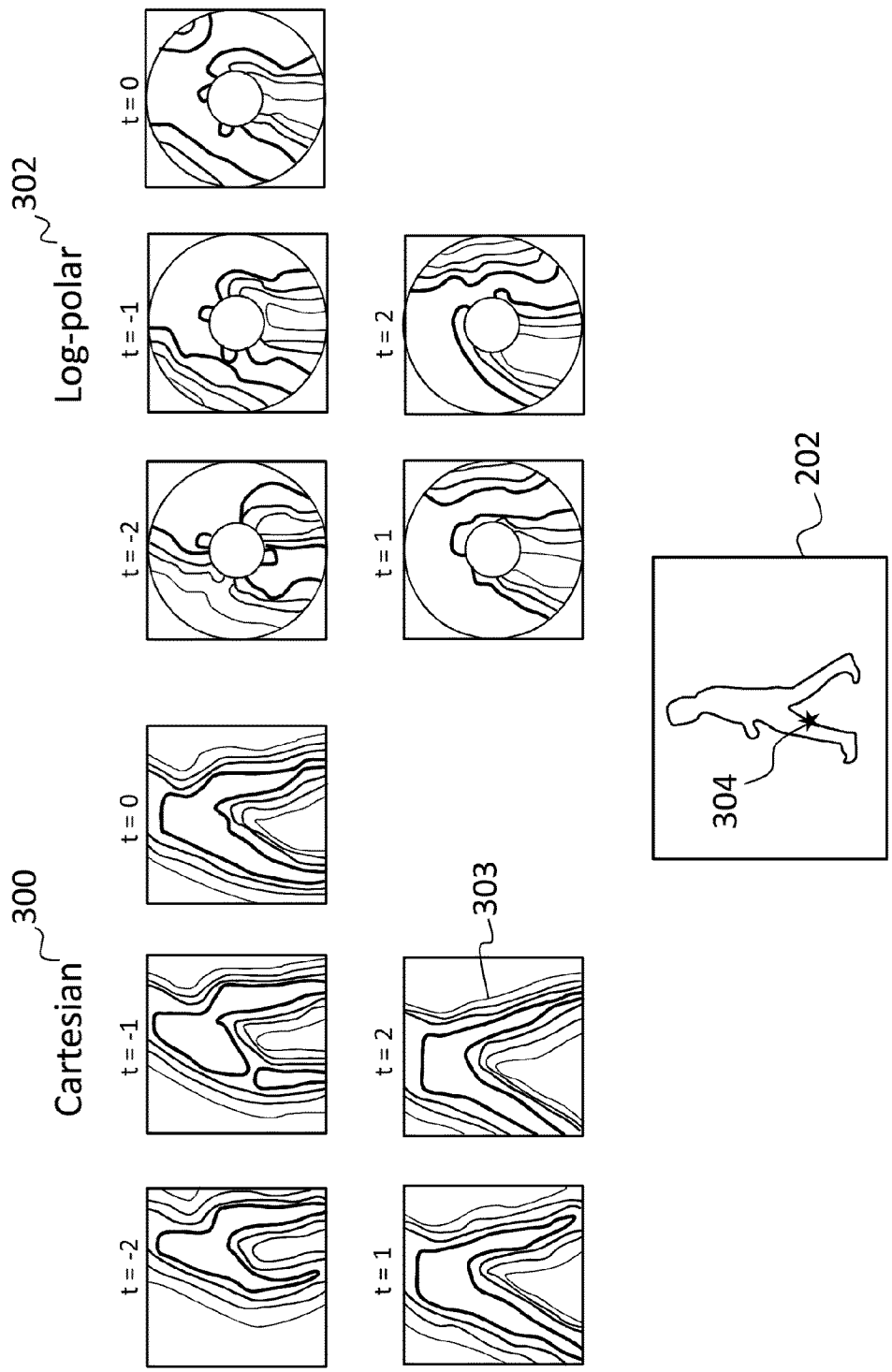
FIG. 3 is an illustration showing examples of self-similarity descriptors according to the present invention in both Cartesian and log-polar coordinate forms.

To use the self-similarity descriptor for video, the approach in [8] can be used with patch size 3×3×1 or 5×5×1 pixels, but the local neighborhood can be extended to include time between 7×7×5 and 41×41×5 pixels depending on image resolution. For the log-polar transform, the angular and radial resolution can be reduced for the time slices further away from pixel p in both directions, as suggested by [8]. However, the log-polar transform provides minimal benefit when using low resolution video images. Examples of the self-similarity descriptor are shown in FIG. 3. This figure shows an example of self-similarity descriptors in the original Cartesian 300 and the log-polar 302 coordinate forms. The varying degrees of self-similarity are shown with contour lines 303, however in practice the images will likely be viewed as pixilated images in color. The star on the walking person's leg highlights the location 304 on the query video frame 202 where the descriptor was computed. The image size is 160×120 pixels. The patch size is 5×5×1 pixels, and the neighborhood size is 31×31×5 pixels. For the log-polar transform 20 angle bins and 4 radius bins were used.

(5.2) Three-Dimensional Shift-Invariant Feature Transform (3-D SIFT)

The 3-D SIFT [7] descriptor is an extension of 2-D SIFT [3] to space-time domain. Following [7], the first step in computing 3-D SIFT descriptors is to find the gradient magnitude $m_{3D}$ and the orientation angles ($\theta$, $\phi$) from the space-time pixel intensity I at the interest point:

$$m_{3D}(x,y,t) = \sqrt{I_x^2 + I_y^2 + I_t^2};$$

$$\theta(x, y, t) = \arctan\left(\frac{I_y}{I_x}\right);$$

and $$\phi(x, y, t) = \arctan\left(\frac{I_t}{\sqrt{I_x^2 + I_y^2}}\right);$$

where the derivatives are approximated by finite differences $I_x = I(x+1, y, t) - I(x-1, y, t)$, $I_y = I(x, y+1, t) - I(x, y-1, t)$, and $I_t = I(x, y, t+1) - I(x, y, t-1)$, and the angle pair $(\theta, \phi)$ represents the direction of gradient in 3-D ($\theta$ is in the range of $(-\pi, \pi)$ and $\phi$ in $(-\pi/2, \pi/2)$).

To find the dominant gradient orientation, a weighted local histogram is constructed in 2-D, and the directional space as represented by a sphere is quantized. Following the approach in [7], the meridian and parallel approach is used, plus weighting based on the solid angles of the quantization bins due to the fact that bins near the equators span larger angular spaces than those near the poles. The dominant gradient direction corresponds to the 2-D histogram bin with the maximum value.

The next step in constructing 3-D SIFT involves computing the orientation sub-histograms for the sub-regions around the interest point. The orientation histogram for each sub-region is a 2-D array, for example, 8×4 pixels in the present example. Each pixel in the sub-regions is represented by a triplet (gradient magnitude $m_{3D}$ and orientation angles $(\theta, \phi)$). The orientation angles must first be rotated so that the local dominant gradient direction has an angle of (0, 0). The orientation histograms from the sub-regions are serialized to create a descriptor vector. Serialization comprises first scanning each 2-D array's elements left-to-right and top-to-bottom, and then concatenating the vectors from all such 2-D arrays into a final vector, the descriptor. In [7] the 3-D SIFT descriptor can have either 2×2×2 or 4×4×4 pixel sub-region configurations. With 8×4 orientation quantization in $(\theta, \phi)$, this would create a descriptor vector of size either 256 or 2048 regardless of the sub-region size. In this implementation, the sub-region size is 4×4×4 pixels, and the sub-region configuration is 4×4×4.

Figure 4:
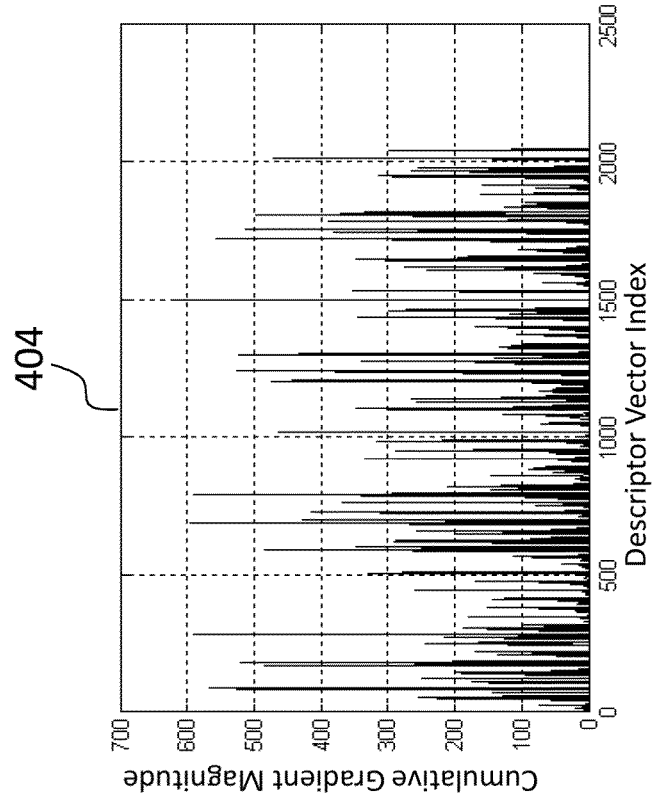
FIG. 4 is an illustration showing examples of video image frames with locations of points of interest highlighted.
Figure 4:
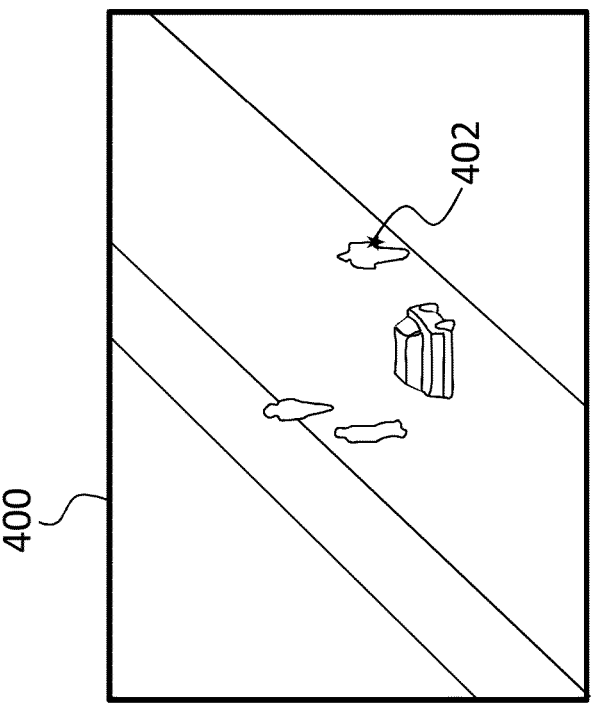

FIG. 4 shows a sample image 400 of a video sequence with the interest point 402 highlighted. The horizontal axis refers to the descriptor vector index, and the vertical axis refers to the values of the original 2-D histogram elements before being serialized into a vector, which is the cumulative gradient magnitude. A corresponding 3-D SIFT descriptor 404 is computed in a 4×4×4 pixel sub-region configuration, producing a descriptor vector with 2048 elements.

(6) INDEXING/SEARCH USING VOCABULARY TREE

Once the descriptors are computed from a query video clip, they can be used to search for similar videos in the video database. The video database is indexed using any of a variety of hierarchical indexing mechanism known in the art. In a desired embodiment, the indexing mechanism used is a clustering tree called a "vocabulary tree." The vocabulary tree concept is introduced by Nister and Stewenius [5] for 2-D image indexing and search. In the vocabulary tree approach, 2-D image descriptors from training images are computed and clustered hierarchically to form a tree during off-line training phase. Each node in the tree can be seen as representing a "virtual" descriptor that is the vector mean of the descriptors it represents. Each of the leaf nodes represents a set of descriptors coming from similar image features which are called "visual words," and the set of all leaf nodes form the "visual vocabulary." Therefore the tree is called a "vocabulary tree."

(6.1) Hierarchical Clustering for Vocabulary Tree

Figure 5:
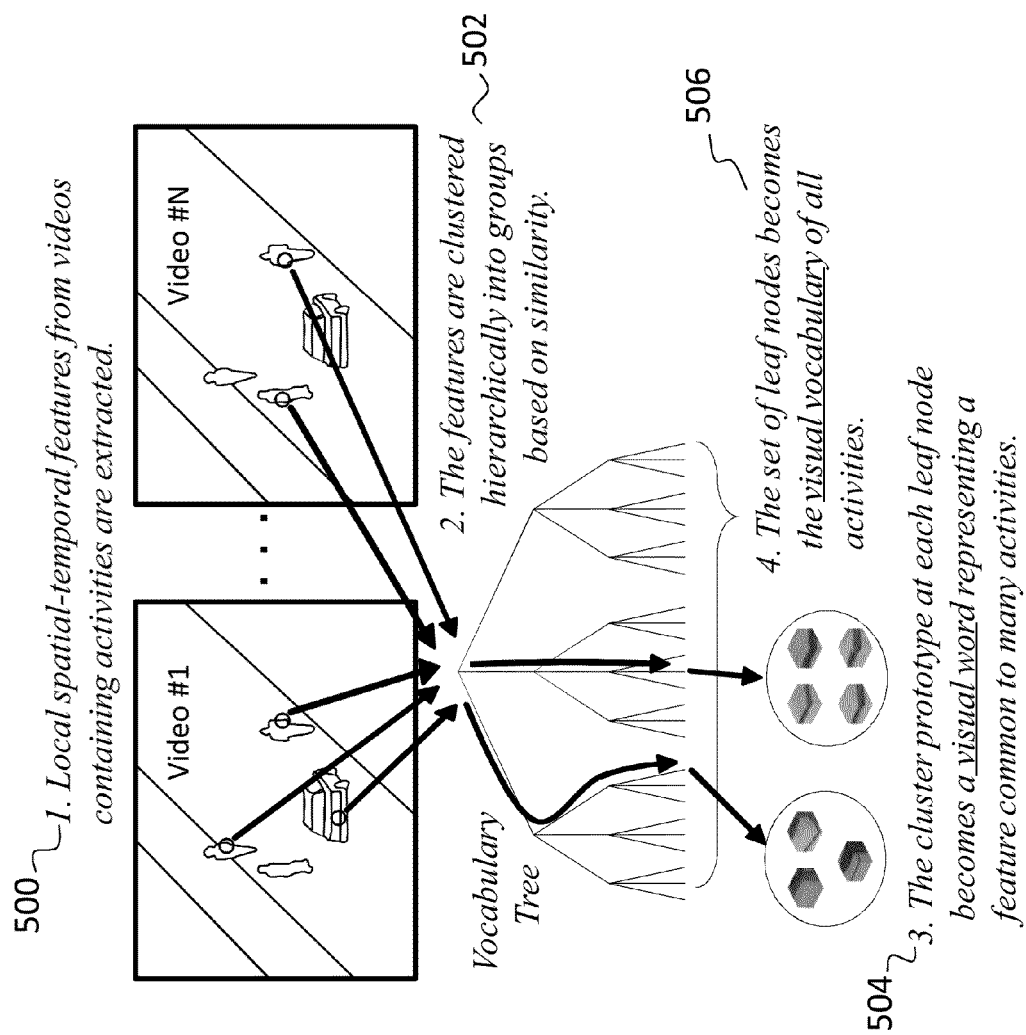
FIG. 5 is an illustration showing a hierarchical indexing mechanism known as a vocabulary tree as used with the present invention.

The same approach to indexing 2-D image descriptors described above can be applied to videos. Using the descriptors extracted from a set of training videos according to the descriptor generation and interest point selection process described above, a vocabulary tree for these spatio-temporal descriptors can be built using hierarchical clustering. The hierarchical clustering process is illustrated in FIG. 5. First, local spatial-temporal features from videos containing activities are extracted 500. Second, the features are clustered hierarchically into groups based on similarity 502. Third, the cluster prototype at each leaf node becomes a visual word representing a feature common to many activities 504. Finally, the set of leaf nodes becomes the visual vocabulary of all activities 506. At the root level, k-means clustering as commonly used in the art (see, e.g. [10]) is performed on all descriptors from all training videos, and k-clusters are found as child nodes. For each child node cluster, k-means is again performed using the same k as in the previous levels. This is done recursively until the desired total number of levels for the tree is reached. In a desired implementation, the branch factor k and tree-depth is pre-determined for each test. In addition, an L2 (Euclidean) distance measure is used during clustering and in indexing/search. However, in other implementations it is possible to have a variable branch factor and to calculate distance by a method other than L2 (Euclidian).

(6.2) Indexing and Search

The vocabulary tree thus built is used for indexing and for searching. Indexing and searching involves finding the closest matching visual word (leaf node) for a given descriptor, which is done by starting from the root and going down the tree following the closest child node at each level until reaching the leaf level.

To index a video clip into the database, all descriptors for the video are computed, then the closest leaf node in the tree for each descriptor is found, and the inverted file is updated at that leaf node. An inverted file keeps pointers to the videos in the database having one or more descriptors belonging to that node, along with the number of such descriptors. The indexing operation does not change the vocabulary tree structure, nor does it change the mean of the "virtual" descriptors at the leaf nodes; it merely adds back pointers to the new videos being added to the database.

During search, descriptors from the query video clip are computed and used to search for the closest leaf nodes in the vocabulary tree. Using information from the inverted files of the visited leaf nodes by all descriptors from the query video, a word frequency vector can be built for the query image using the well-known TF-IDF (term frequency, inverse document frequency) weighting [9], and compared with the word frequency vectors for videos in the database to produce a similarity score in the form of a relevance ranking as in [9]. Relevant results can be output as set of candidate videos or reprocessed by any of a variety of means known in the art to refine the set of candidate videos prior to output.

(7) SCORING CANDIDATE VIDEOS

The search function described above produces a set of candidate videos which are similar to the query video, but does not necessarily provide a label (word) indicating the most likely action that the query video depicts. In other words, the search function does not inherently act as an activity recognition function. To test the vocabulary tree for activity recognition, descriptors are extracted from query video clips to search for video clips in the database. Instead of the TF-IDF scoring algorithm discussed in [9], a simplified voting scheme is described below. For each descriptor k in the query video, a matching visual word, denoted as i=T(k), is found in the vocabulary tree, and then votes are cast for the videos where the visual word i originates. Specifically, for a visual word i and video clip d in the database, the vector $\{n_d | \forall d\}$ represents the frequency distribution of word i in all videos. Higher $n_{id}$ means higher correlation of video d with the visual word i. In a desired embodiment, the voting scheme computes the similarity score vector over all matching visual words i to the descriptors in the query video:

$$score(d) = \sum_i [n_{id} | i \in \{T(k) | \forall k \in \text{query video}\}],$$

$\forall d \in$ database.

Note that even though the above equation assigns scores to every video in the database, which can be huge, usually most of the videos will get score of 0 because they do not contain any visual words that are present in the query video. Therefore, only a small set of videos that contains one or more visual words from the query video need be scored, which makes this approach scalable and independent to the size of the video database.

(8) REDUCTION TO PRACTICE AND EXPERIMENTAL RESULTS

The present invention has been implemented in computer software written in Matlab as discussed above. Experiments have been conducted to test the effectiveness of this invention. The descriptors discussed in the "(4) Descriptor Generations" section, above, were applied to the search of human actions/activities in a video database of low resolution videos. This is especially useful in surveillance analysis in which an analyst wants to find videos of certain activity similar to a given sample video clip.

In experimentation, short video sequences were extracted from a data set as in [6]. The data set contained six types of human actions (running, hand-waving, walking, handclapping, jogging, and boxing) from different people, under different background and lighting conditions. The videos also contain people walking/running/jogging at different angles with respect to the camera, and at different distance resulting in substantially different apparent sizes in the videos. The resolution of the original video image (160×120 pixels) was reduced by a factor of four, to 40×30 pixels, to test the algorithm's performance in low-resolution videos (~10 cm/pixel resolution), typical of low-resolution surveillance videos. FIG. 2 shows samples of test frames 202 with interest points 200 superimposed as dots. The tested video database contained 50 short clips of 50 frames for each activity type for a total of 300 video clips.

Interest points from each video clip were detected according to the process discussed in the "(3) Interest Point Selection" section above. There is no motion segmentation or tracking involved. The self-similarity descriptor discussed in the "(4.1) Self-Similarity Measure" and the 3-D SIFT descriptor are computed at each interest point. For SSM, the patch size is 3×3×1 pixels, and the correlation neighborhood is 7×7×5 pixels resulting in 125-D descriptor vectors. Log-polar transform was not used due to the low-resolution of the video images and the small size of the neighborhood. For 3-D SIFT, a 2×2×2 pixel sub-region configuration and a sub-region size of 4×4×4 pixels resulting in 256-dimension descriptors was used. Approximately 70,000 descriptors were computed from all the video clips. Vocabulary trees were built using hierarchical k-means-based clustering. The trees have four levels (counting the root), and have various branch factors from 2 to 20 to test the effect of the size of visual vocabulary has on performance.

The score vector is sorted and the top-N candidate videos were kept for performance analysis purpose. In tests, all 300 video clips were used in the database as query videos to compute average search performance, each time leaving out the query video clip when producing the top-N candidates. By varying the N in the top-N scoring process, the probability of detection, $P_D$, and probability of false alarm can be computed, $P_{FA}$, and a plot of the rate of change (ROC) curve can be developed. The $P_D$ and $P_{FA}$ for a particular N are defined as:

$$P_D = \frac{\text{Number of videos in top-}N \text{ that are of the same class as the query video}}{\text{Total number of videos in database that are of the same class as the query video}};$$

and $$P_{FA} = \frac{\text{Number of videos in top-}N \text{ that are NOT of the same class as the query video}}{N};$$

where $P_D$ and $P_{FA}$ were further averaged over all videos and all six actions in the database.

Figure 6:
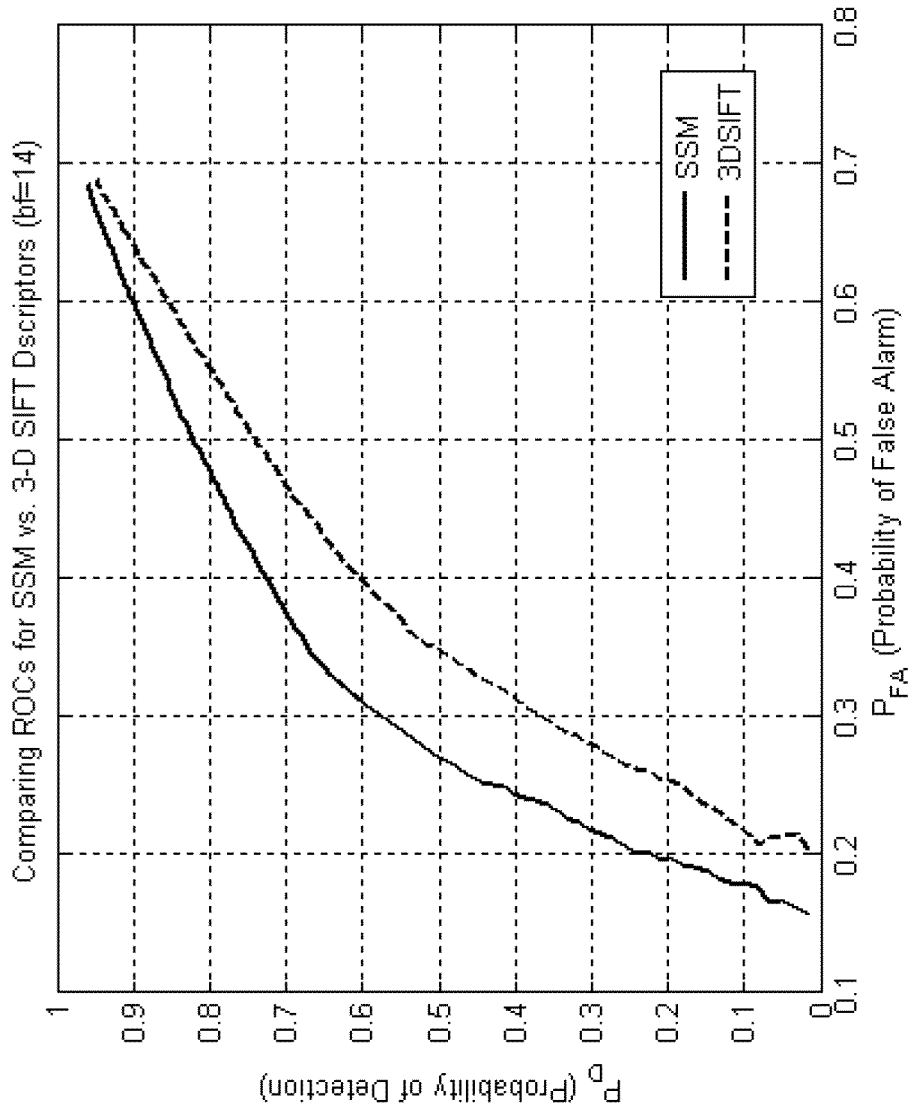
FIG. 6 is a graph showing false alarm rate vs. probability of detection for self-similarity and 3-D SIFT descriptors.

FIG. 6 shows the rate of change (ROC) curves using self-similarity (SSM) and 3-D SIFT descriptors as described earlier with the scoring process discussed here, using a vocabulary tree branch factor of 14. The SSM appears to be better at all $P_{FA}$ levels than 3-D SIFT in this setting. However, given this data it cannot be concluded that SSM is necessarily better than 3-D SIFT in all situations since performance levels are affected by the location of interest points, the size of the descriptor, and the size of the visual vocabulary, etc.

Figure 7B:
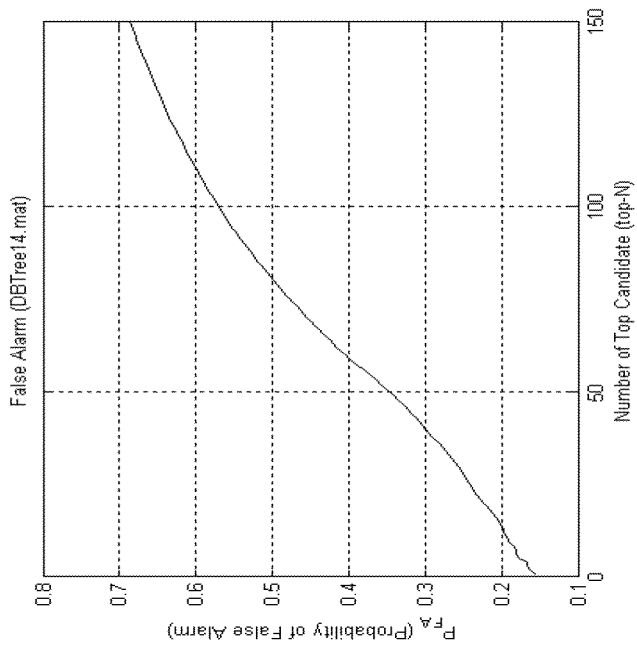
FIG. 7B is a graph showing top candidate scoring vs. false alarm rate for the descriptors of the present invention.
Figure 7A:
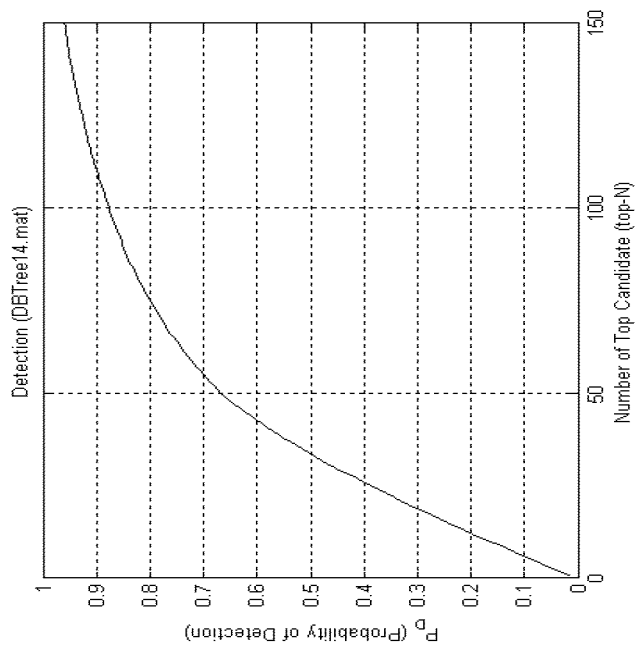
FIG. 7A is a graph showing top candidate scoring vs. probability of detection for the descriptors of the present invention.

As can be seen in FIG. 6, the ROC curves level off slightly after approximately $P_{FA}$=0.35. This is because a top-N scoring method was used, and there are only 50 videos (including the query video) of the same action class in the database. When the N reaches 50, the gain in $P_D$ drops compared with the gain in $P_{FA}$. This effect can be seen more clearly in the $P_D$ and $P_{FA}$ plots as functions of N used in top-N scoring shown in FIGS. 7A and 7B, respectively. As can be seen in FIG. 7A, $P_D$'s rate of increase drops while that of $P_{FA}$ picks up when N reaches around 50, the number of truth class instances in the database for any actions in the experimental video database.

Figures 8A, 8B:
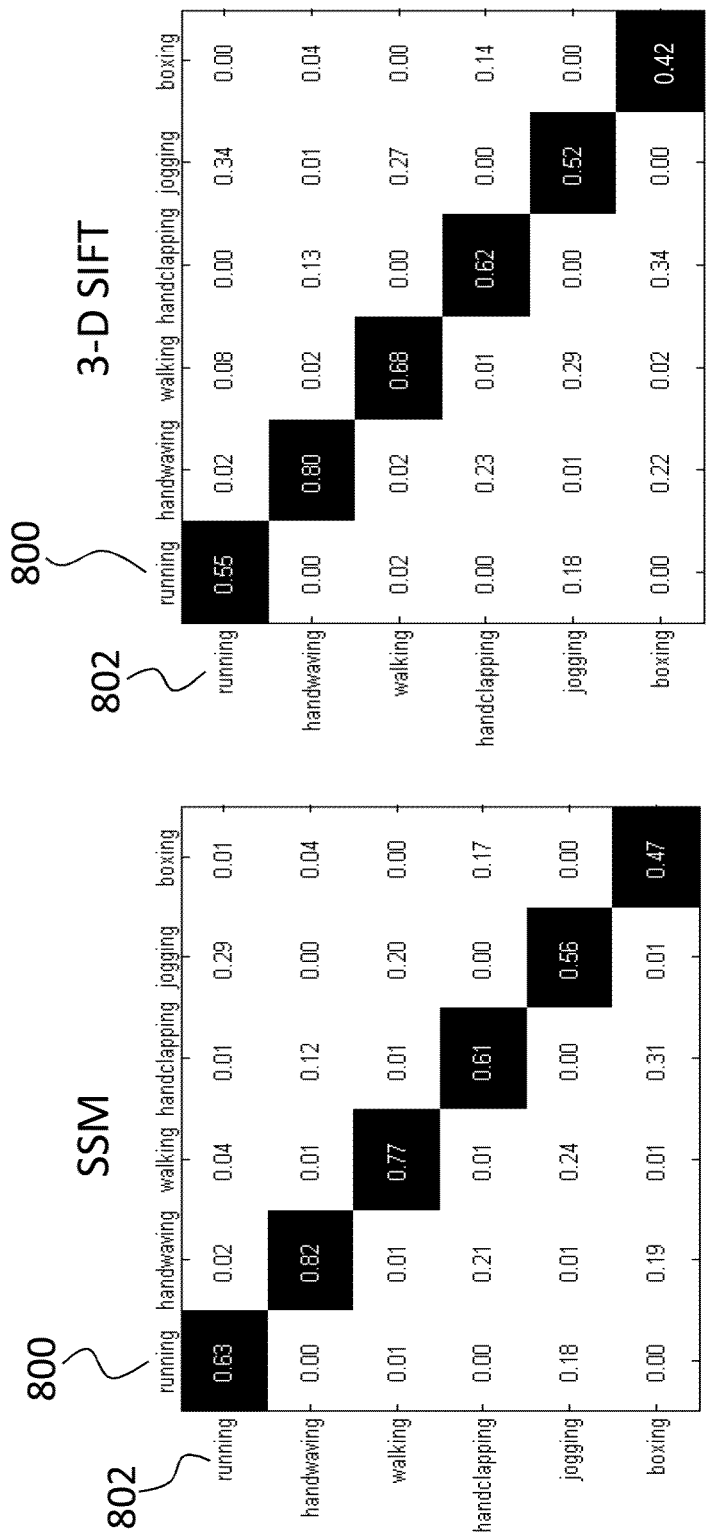
FIG. 8A is a confusion matrix for a self-similarity descriptor with respect to various human activities.
FIG. 8B is a confusion matrix for a Three-dimensional Shift-invariant Feature Transform (3-D SIFT) descriptor with respect to various human activities.

Finally, confusion matrices for SMM and 3-D SIFT descriptors were computed for the cases of branch factor 14 for vocabulary tree and N=50 for top-N scoring. The confusion matrices for SSM and 3-D SIFT are shown in FIGS. 8A and 8B, respectively. For each confusion matrix, the row labels 800 represent the action classes used for querying while the columns 802 are the retrieved action class labels from the search. Note the numbers in each row should add up to 1.0, but some of them do not due to rounding. As expected, FIGS. 8A and 8B show that the greatest confusion exists between walking, running and jogging, and between handwaving, handclapping and boxing. The differences in performance between SSM and 3-D SIFT can be mostly attributed to the performance in running and walking where SSM outperform 3-D SIFT by a wider margin.

(9) DATA PROCESSING SYSTEM

Figure 9:
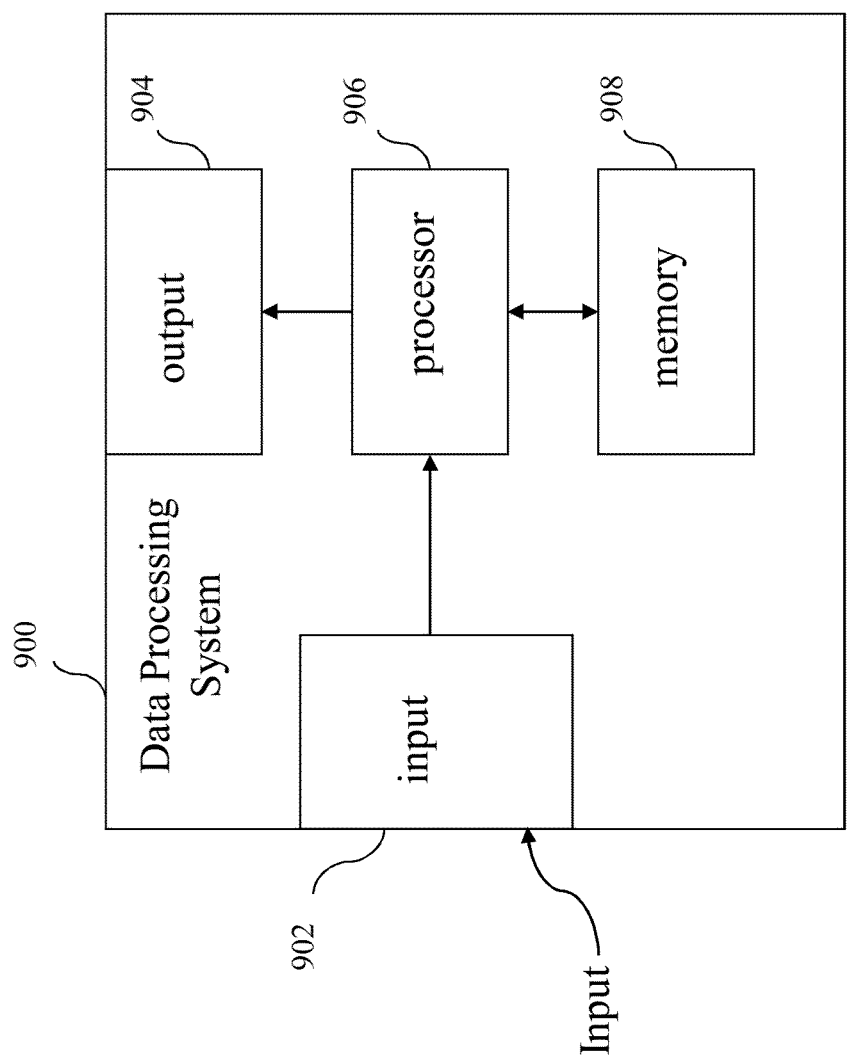
FIG. 9 is a block diagram showing the components of a data processing system in accordance with the present invention.

A block diagram depicting the components of a data processing system for use with the present invention is provided in FIG. 9. The data processing system 900 comprises an input 902 for receiving queries from a user including input videos, as well as video archive information from a pre-existing database. Note that the input 902 may include multiple "ports." Typically, input is received from at least one sensor, non-limiting examples of which include video image sensors. An output 904 is connected with the processor for outputting the final candidate videos to a user. Output may also be provided to other devices or other programs; e.g., to other software modules, for use therein. The input 902 and the output 904 are both coupled with a processor 906, which may be a general-purpose computer processor or a specialized processor designed specifically for use with the present invention. The processor 906 is coupled with a memory 908 to permit storage of data and software that are to be manipulated by commands to the processor 906.

(10) COMPUTER PROGRAM PRODUCT

Figure 10:
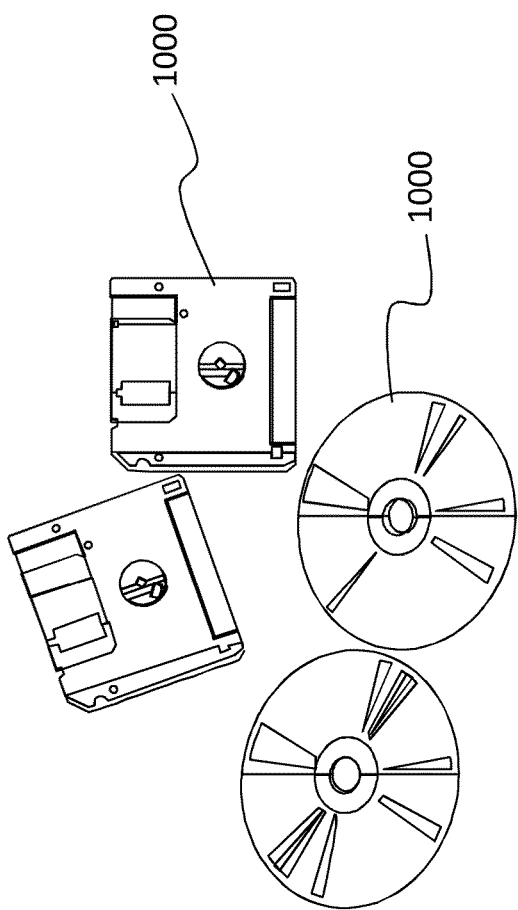
FIG. 10 is an illustration of a computer program product in accordance with the present invention.

An illustrative diagram of a computer program product embodying the present invention is depicted in FIG. 10. The computer program product 1000 is depicted as an optical disk such as a CD or DVD. However, as mentioned previously, the computer program product generally represents computer-readable instruction means stored on any compatible computer-readable medium. The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

What is claimed is:

1. A data processing system for content-based video retrieval, comprising one or more processors configured to perform operations of:
    receiving a query video clip comprising a sequence of video frames, where the sequence of video frames depicts an activity;
    performing an interest point selection on the query video to obtain a set of interest points describing locations in the video frames that are relevant to the activity;
    calculating a set of spatio-temporal descriptors within a local neighborhood of the set of interest points;
    searching an indexed video database containing video clips of known activities using the set of spatio-temporal descriptors as calculated from the query video clip to obtain a set of candidate videos which contain activities similar to the activity in the query video, whereby the activity in the query video can be identified as a known activity in the candidate videos;
    wherein the interest point selection comprises an operation of selecting points which have a high motion content, where the motion content is measured by a degree of difference between pixel values in a pair of consecutive image frames, and where high motion content exists when the measured motion content exceeds a predetermined threshold;
    where the set of spatio-temporal descriptors are of a type selected from the group consisting of a self-similarity descriptor, and a shift-invariant feature transform descriptor;
    where each candidate video is given a similarity score describing a degree of similarity between the candidate video and the query video, and the similarity score is evaluated based on relevance computed using visual word frequencies;
    further configured to perform an operation of indexing a video database containing videos of known activities using a hierarchical indexing mechanism; and
    where the hierarchical indexing mechanism is a vocabulary tree having leaf nodes, and wherein in indexing the video database, all descriptors for the video clips of known activities are computed, with a closest leaf node in the vocabulary tree for each descriptor being found.

2. A data processing system for content-based video retrieval, comprising one or more processors configured to perform operations of:
    receiving a query video clip comprising a sequence of video frames, where the sequence of video frames depicts an activity;
    performing an interest point selection on the query video to obtain a set of interest points describing locations in the video frames that are relevant to the activity;
    calculating a set of spatio-temporal descriptors within a local neighborhood of the set of interest points;
    searching an indexed video database containing video clips of known activities using the set of spatio-temporal descriptors as calculated from the query video clip to obtain a set of candidate videos which contain activities similar to the activity in the query video, whereby the activity in the query video can be identified as a known activity in the candidate videos;
    indexing a video database containing videos of known activities using a hierarchical indexing mechanism; and
    where the hierarchical indexing mechanism is a vocabulary tree having leaf nodes, and wherein in indexing the video database, all descriptors for the video clips of known activities are computed, with a closest leaf node in the vocabulary tree for each descriptor being found.

3. A computer program product for content-based video retrieval, the computer program product comprising computer-readable instruction means stored on a non-transitory computer-readable medium that are executable by a computer having a processor for causing the processor to perform operations of:
    receiving a query video clip comprising a sequence of video frames, where the sequence of video frames depicts an activity;
    performing an interest point selection on the query video to obtain a set of interest points describing locations in the video frames that are relevant to the activity;
    calculating a set of spatio-temporal descriptors within a local neighborhood of the set of interest points;
    searching an indexed video database containing video clips of known activities using the set of spatio-temporal descriptors as calculated from the query video clip to obtain a set of candidate videos which contain activities similar to the activity in the query video, whereby the activity in the query video can be identified as a known activity in the candidate videos;

indexing a video database containing videos of known activities using a hierarchical indexing mechanism; and where the hierarchical indexing mechanism is a vocabulary tree having leaf nodes, and wherein in indexing the video database, all descriptors for the video clips of known activities are computed, with a closest leaf node in the vocabulary tree for each descriptor being found.

\* \* \* \* \*